L. KOSIOL.
Liquid-Measure.
No. 215,371.  Patented May 13, 1879.
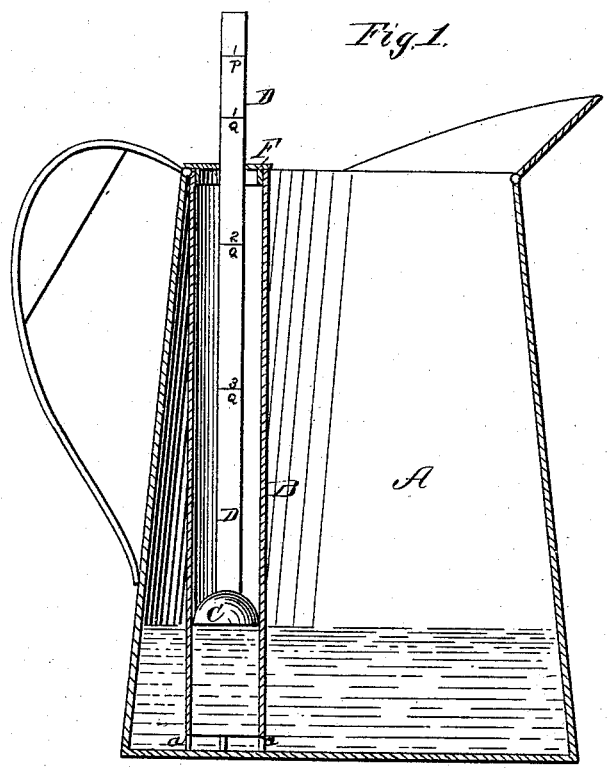
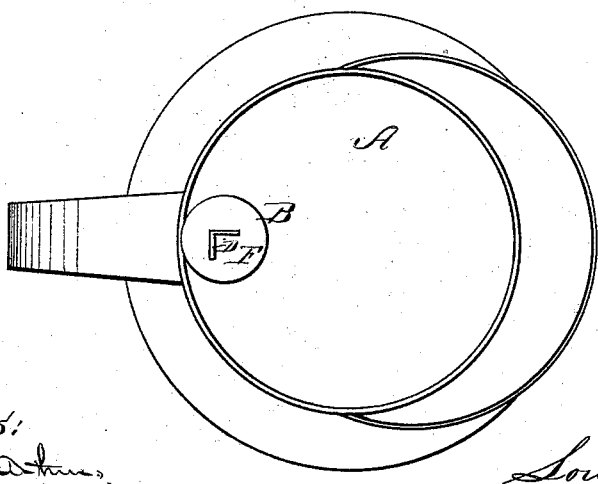

UNITED STATES PATENT OFFICE.

LOUIS KOSIOL, OF LOUISVILLE, KENTUCKY.

IMPROVEMENT IN LIQUID-MEASURES.

Specification forming part of Letters Patent No. 215,371, dated May 13, 1879; application filed March 26, 1879.

*To all whom it may concern:*

Be it known that I, LOUIS KOSIOL, of Louisville, in the county of Jefferson and State of Kentucky, have invented certain new and useful Improvements in Liquid-Measures; and I do hereby declare that the following is a full, clear, and exact description thereof, reference being had to the accompanying drawings, and to the letters of reference marked thereon, which form part of this specification.

My invention relates to liquid-measures; and it consists in a measure provided in its interior with a tube or chamber open at its lower end, and provided with legs a a, and closed at its upper end by a removable flanged cover, having an L-shaped slot in its top face, and provided in its interior with a rising-and-falling float fitting the tube, and provided with an L-shaped graduated stem, passing through and guided by the L-shaped slot in the cover of the tube, the L-shaped graduated stem indicating on either of its faces and from either side of the measure the quantity of liquid in the measure, as hereinafter more fully set forth.

In order to enable others skilled in the art to which my invention appertains to make and use the same, I will now proceed to describe its construction and operation, referring to the annexed drawings, in which—

Figure 1 is a central vertical section, and Fig. 2 a plan view.

A represents a liquid-measure for holding, say, one gallon, more or less. Within this measure, to one side, is attached a tube or chamber, B, which is open at the bottom, and is supported by legs a a, projecting from its base, so that any liquid in the measure will stand at the same height within said tube or chamber.

In the tube or chamber B is a float, C, fitting the tube, and provided with a stem, D, which passes up through a flanged removable cap, F, provided with an L-shaped slot, on the upper end of said tube or chamber.

The stem D is graduated to show lesser quantities than what the measure A will hold when full, and is made angular or L-shaped, with graduations on both its faces, so that the graduations may be read from either side of the can.

When it is desired to clean the float and its stem or the interior of the tube, the cover F is removed, and the stem and float removed.

The L-shaped slot in the cap F serves as a guide to the stem, and prevents binding of the float as it rises and falls in the tube. For instance, if it is a gallon-measure, the stem may be graduated for one-half pint, one pint, one quart, &c., and in the same manner no matter what size the main measure A may be.

When liquid is poured or otherwise admitted into the measure, such liquid rises to the same height in the tube or chamber B, and, of course, the float C, with its stem, rises with it, the graduations on the stem showing the exact quantity in the measure.

I am aware that the method of indicating the quantity of liquid in a measure by means of a float is not new, and therefore do not, broadly, claim such an idea; but What I do claim, and desire to secure by Letters Patent, is—

The combination, with the liquid-measure A and tube B, open at its lower end, and provided with the legs a a, resting on the bottom of the measure, of the removable flanged cover F, having an L-shaped slot in its face, and float C, having the L-shaped stem D, graduated on its outer faces, substantially as shown and described.

In testimony that I claim the foregoing as my own invention I affix my signature in presence of two witnesses.

LOUIS KOSIOL.

Witnesses:
 FRANK DONAHUE,
 LOUIS SAMPSON.